(12) United States Patent
Cuevas Cuadrado

(10) Patent No.: US 10,787,376 B2
(45) Date of Patent: Sep. 29, 2020

(54) DEVICE FOR WATER DISINFECTION BY ULTRAFILTRATION

(71) Applicant: Antonio Cuevas Cuadrado, Barcelona (ES)

(72) Inventor: Antonio Cuevas Cuadrado, Barcelona (ES)

( * ) Notice: Subject to any disclaimer, the term of this patent is extended or adjusted under 35 U.S.C. 154(b) by 0 days.

(21) Appl. No.: 16/229,329

(22) Filed: Dec. 21, 2018

(65) Prior Publication Data

US 2019/0194037 A1 Jun. 27, 2019

(30) Foreign Application Priority Data

Dec. 24, 2017 (ES) .................................. 201731465
Feb. 28, 2018 (ES) ............................... 201830268 U

(51) Int. Cl.

| | | |
|---|---|---|
| *C02F 1/44* | (2006.01) | |
| *C02F 1/32* | (2006.01) | |
| *B01D 61/14* | (2006.01) | |
| *B01D 61/18* | (2006.01) | |
| *B01D 61/02* | (2006.01) | |
| *B01D 61/08* | (2006.01) | |

(Continued)

(52) U.S. Cl.
CPC ............ *C02F 1/444* (2013.01); *B01D 61/027* (2013.01); *B01D 61/08* (2013.01); *B01D 61/142* (2013.01); *B01D 61/145* (2013.01); *B01D 61/18* (2013.01); *C02F 1/002* (2013.01); *C02F 1/008* (2013.01); *C02F 1/325* (2013.01); *C02F 1/442* (2013.01); *B01D 2311/06* (2013.01); *B01D 2311/20* (2013.01); *B01D 2311/2619* (2013.01); *B01D 2313/243* (2013.01); *B01D 2313/365* (2013.01); *B01D 2317/04* (2013.01); *B01D 2319/04* (2013.01); *C02F 1/32* (2013.01); *C02F 2101/20* (2013.01); *C02F 2201/009* (2013.01); *C02F 2209/003* (2013.01); *C02F 2209/008* (2013.01); *C02F 2209/05* (2013.01); *C02F 2209/06* (2013.01); *C02F 2209/11* (2013.01); *C02F 2209/15* (2013.01); *C02F 2303/04* (2013.01); *C02F 2303/16* (2013.01); *H04B 1/3827* (2013.01); *H04W 4/80* (2018.02)

(58) Field of Classification Search
None
See application file for complete search history.

(56) References Cited

U.S. PATENT DOCUMENTS

2003/0097087 A1* 5/2003 Gura .................. A61M 1/3403
604/6.09

FOREIGN PATENT DOCUMENTS

ES 2017031237 11/2017

* cited by examiner

*Primary Examiner* — Richard C Gurtowski
(74) *Attorney, Agent, or Firm* — Eugenio J. Torres-Oyola; Victor M. Rodriguez-Reyes; Rafael Rodriguez-Muriel

(57) ABSTRACT

Device for water disinfection by ultrafiltration. The device comprises a filtering assembly with at least one ultrafiltration membrane (6) inside a casing (10); a pump (5, 15), powered with electrical energy, configured for driving water to be filtered to said at least one ultrafiltration membrane (6); and an electric supply connection (2) for powering said pump (5) from a power supply. Said at least one ultrafiltration membrane is located in said casing (10) in a position in which it receives the feed flow of the water to be filtered by gravity or pressure; the electric power supply is provided by a battery included in a portable communication device (4); and the intensity of the current consumed by the pump (5, 15) is below 1.2 A, with a supply voltage of up to 24 V.

14 Claims, 4 Drawing Sheets

(51) Int. Cl.
*C02F 1/00* (2006.01)
*H04W 4/80* (2018.01)
*C02F 101/20* (2006.01)
*H04B 1/3827* (2015.01)

DEVICE FOR WATER DISINFECTION BY ULTRAFILTRATION

TECHNICAL FIELD

The present invention generally relates to a portable, i.e., readily transportable, device for water disinfection by means of ultrafiltration, and more particularly to a device for water disinfection comprising one or more ultrafiltration membranes, an electric pump which feeds the ultrafiltration membrane(s) with the water to be disinfected, and power supply means which supply electrical energy to the pump.

Within the chemical industry, the invention is comprised in the technical field of contaminated water purification by means of ultrafiltration of the water.

BACKGROUND OF THE INVENTION

Document ES2017031237U describes equipment for purifying contaminated water by means of ultrafiltration, which comprises an inlet conduit for the contaminated water to be purified, ultrafiltration membranes for the contaminated water, arranged in parallel downstream of said inlet conduit, an outlet collector for collecting the purified ultrafiltered water, a submersible electric pump for driving the contaminated water from the contaminated water source to the inlet conduit, electric batteries for supplying electrical energy to the pump, and a folding panel solar for charging the batteries.

Patent application P201731465 is also known, said application describing a device for purifying water by means of ultrafiltration that is similar to that of the mentioned document ES2017031237U, wherein the electrical energy for operating the pump is supplied by a battery included in a portable communication device, which is optionally provided with an auxiliary battery.

DESCRIPTION OF THE INVENTION

The present invention provides a portable device for water disinfection by ultrafiltration comprising a filtering assembly which includes one or more ultrafiltration membranes arranged inside a casing, a pump (submersible or included in said casing of the device) powered with electrical energy and configured for driving water to be filtered to the one or more ultrafiltration membranes, and an electric supply connection for powering the pump from a power supply.

The one or more ultrafiltration membranes are located in the casing in a position in which they receive the feed flow of the water to be filtered by gravity or pressure.

The electric power supply is provided by a battery included in a portable communication device, and the intensity of the current consumed by the pump is preferably below 1.2 A, with a supply voltage of between 3 and 24 V.

The one or more ultrafiltration membranes preferably have a passage of between 0.1 and 0.01 microns, so water can pass therethrough while all the particles having a size larger than the mentioned passage are retained in the ultrafiltration membranes.

In one embodiment, the casing of the filtering assembly furthermore houses an ultraviolet light illumination unit for eliminating bacteria, viruses, fungi, and spores that may be present in the water flow which has passed through the one or more ultrafiltration membranes. The ultraviolet light illumination unit is powered from the same power supply as the pump, i.e., from the battery included in the portable communication device. The electrical consumption of the device including the pump and the ultraviolet light illumination unit is less than or equal to 30 W. It must be indicated that the preceding power value is not limiting, given that in some embodiments, the pump and the ultraviolet light illumination unit may have a higher power value (for example, for particular cases in which the portable communication device is capable of providing a power of up to 100 W). In this case, the intensity of the current consumed by the pump will also be higher, about 4 A.

In one embodiment, the device comprises two ultrafiltration membranes and the water to be filtered is fed to the membranes through a feed tube from the pump which is submersible in this embodiment, and the feed tube is subdivided by a fork into two branches, one for each of the ultrafiltration membranes. Respective outflows are supplied from the ultrafiltration membranes through respective outlet conduits.

Given that the ultrafiltration membranes receive the feed flow of the water to be filtered by gravity or pressure, the pressure of the feed flow entering the ultrafiltration membranes is kept at a value equal to or greater than atmospheric pressure.

Optionally, the pump can be actuated to drive water countercurrent by suctioning it through the outlet conduits and discharging it through the feed tube for cleaning the ultrafiltration membranes.

If the pump, for example, a diaphragm or piston pump, is included in the casing itself, the pump operates by suction. Likewise, in this case, due to the fact that the water flow leaving the pump has sufficient pressure of about 2 kg/cm$^2$, without this being limiting as the outlet pressure of the pump may reach 6 kg/cm$^2$, i.e., 6 ATM, the device may further include one or more nanofiltration membranes for eliminating salts and/or heavy metals.

In one embodiment, the casing of the filtering assembly further includes one or more sensors configured for measuring properties of the water, such as, for example, the conductivity, pH, nitrate content, colorimetry, and turbidity in the filtered water flow which has passed through the ultrafiltration membranes, and for emitting data representative of the measured properties.

These sensors are operatively connected with the portable communication device, which is suitable for performing computer processing on the mentioned data supplied by the sensors, and depending on a result of the processing, for adapting the operation of the pump or stopping it.

Particularly, the portable communication device includes a user interface for displaying at least part of the data supplied by the sensors and/or the result of the computer processing thereof. The portable communication device can be, for example, a smartphone or a tablet, among others.

The sensors are connected with the portable communication device preferably through wireless technology, including Bluetooth, for example. The electric supply connection for powering the pump is connected by means of a cable to a USB or micro USB port of the portable communication device, for example.

BRIEF DESCRIPTION OF THE DRAWINGS

The foregoing and other advantages and features will be better understood based on the following detailed description of a merely illustrative, non-limiting embodiment in reference to the attached drawings, in which

FIG. 3 shows the operating diagram when water is being filtered.

FIG. 4 shows the operating diagram of the cleaning of the membrane.

DETAILED DESCRIPTION OF SEVERAL EMBODIMENTS

Figure 1:
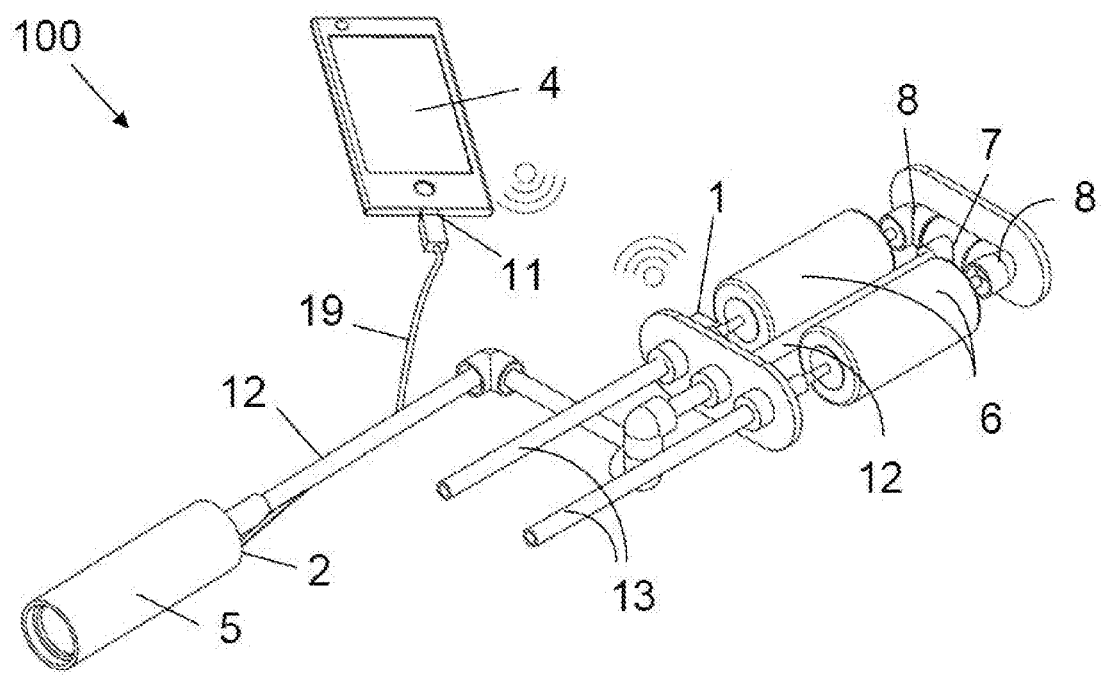
FIG. 1 is a schematic perspective view of a device for water disinfection by ultrafiltration according to an embodiment of the present invention.
Figure 2:
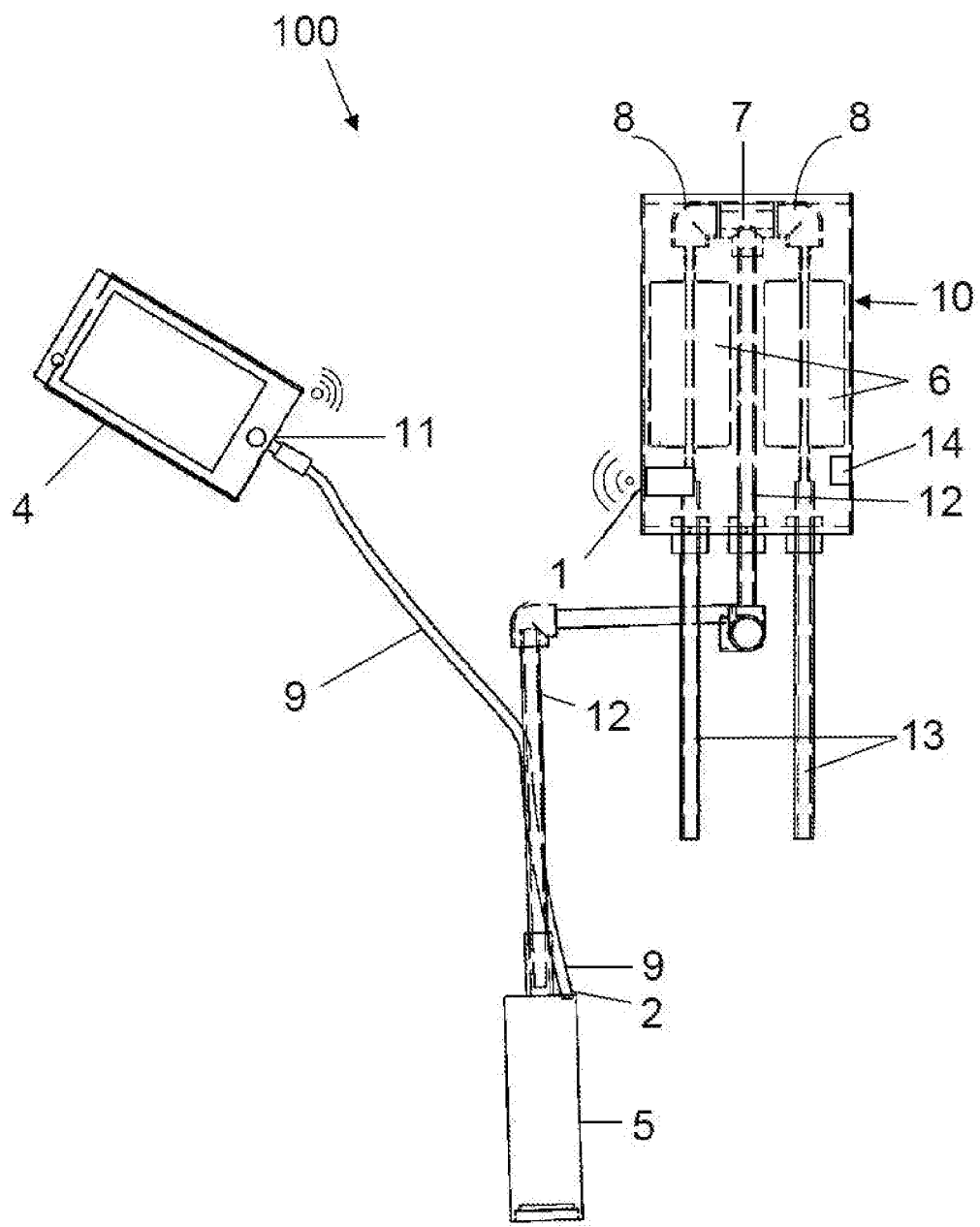
FIG. 2 is a front view of the device of FIG. 1, further including a protective casing and an ultraviolet light illumination unit.

In reference to FIGS. 1 and 2, reference number 100 generally designates a device for water disinfection by ultrafiltration according to an embodiment of the present invention, which comprises a filtering assembly including two ultrafiltration membranes 6 and a pump 5, in this case a submersible pump, powered with electrical energy. It must be indicated that the device 100 only has to include one ultrafiltration membrane 6 in order to be able to work properly.

The pump 5 has a water-driving outlet which is connected to a feed tube 12 that is subdivided by a fork 7 into two branches 8, and each branch 8 provides a feed flow of the water to be filtered to one of the ultrafiltration membranes 6. The pump 5 is therefore configured for driving water to be filtered to the ultrafiltration membranes 6. The ultrafiltration membranes 6 have outlets from which respective outflows of filtered water are fed through respective outlet conduits 13.

The two ultrafiltration membranes 6 are arranged inside a protective casing 10 made of aluminum, for example (not depicted in FIG. 1 for greater clarity of the drawing). As shown in FIG. 2, a part of the feed tube 12 including the fork 7 and the two branches 8, as well as a part of the outlet conduits 13, are also located inside the casing 10, which is particularly provided with a cover.

The ultrafiltration membranes 6 are located in the casing 10 in a position in which they receive the corresponding feed flows by gravity. The pressure of the feed flow entering the ultrafiltration membranes 6 is therefore kept at a value equal to or greater than atmospheric pressure. Although the membranes 6 preferably act by gravity, they could also act by pressure from the electric pump or a manually-operated pump.

The pump 5 has an electric supply connection 2 which is connected by means of a cable 9 to a USB or micro USB port 11 of a portable communication device 4, such as a smartphone, for example. The pump 5 therefore receives electrical energy from a power supply provided by a battery included in the portable communication device 4. The intensity of the current consumed by the pump 5 is below 1.2 A, with a supply voltage of up to 24 V.

Figure 3:
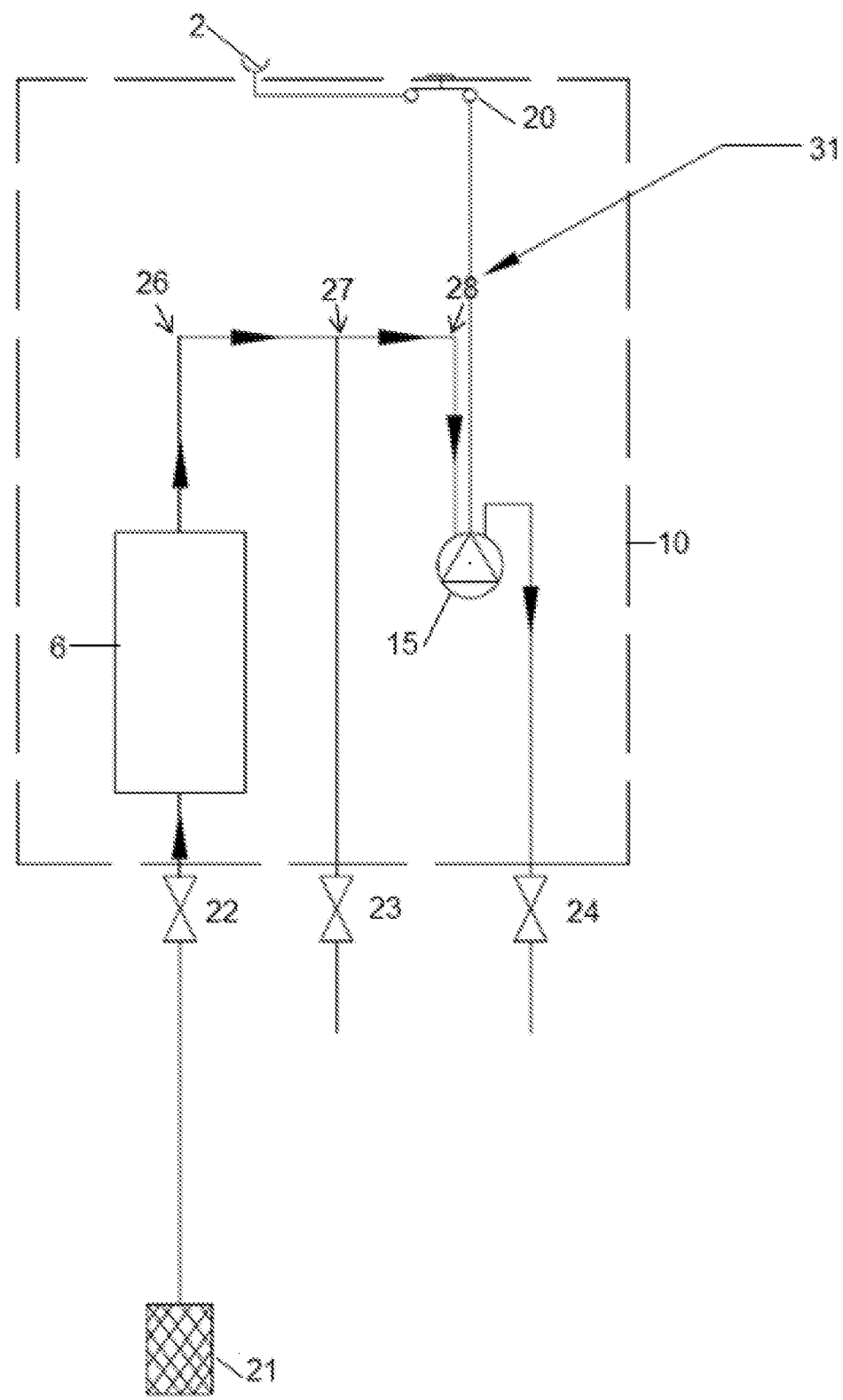
FIGS. 3 and 4 are schematic views of a device for water disinfection by ultrafiltration according to another embodiment of the present invention; in this particular case when the pump is included in the casing.
Figure 4:
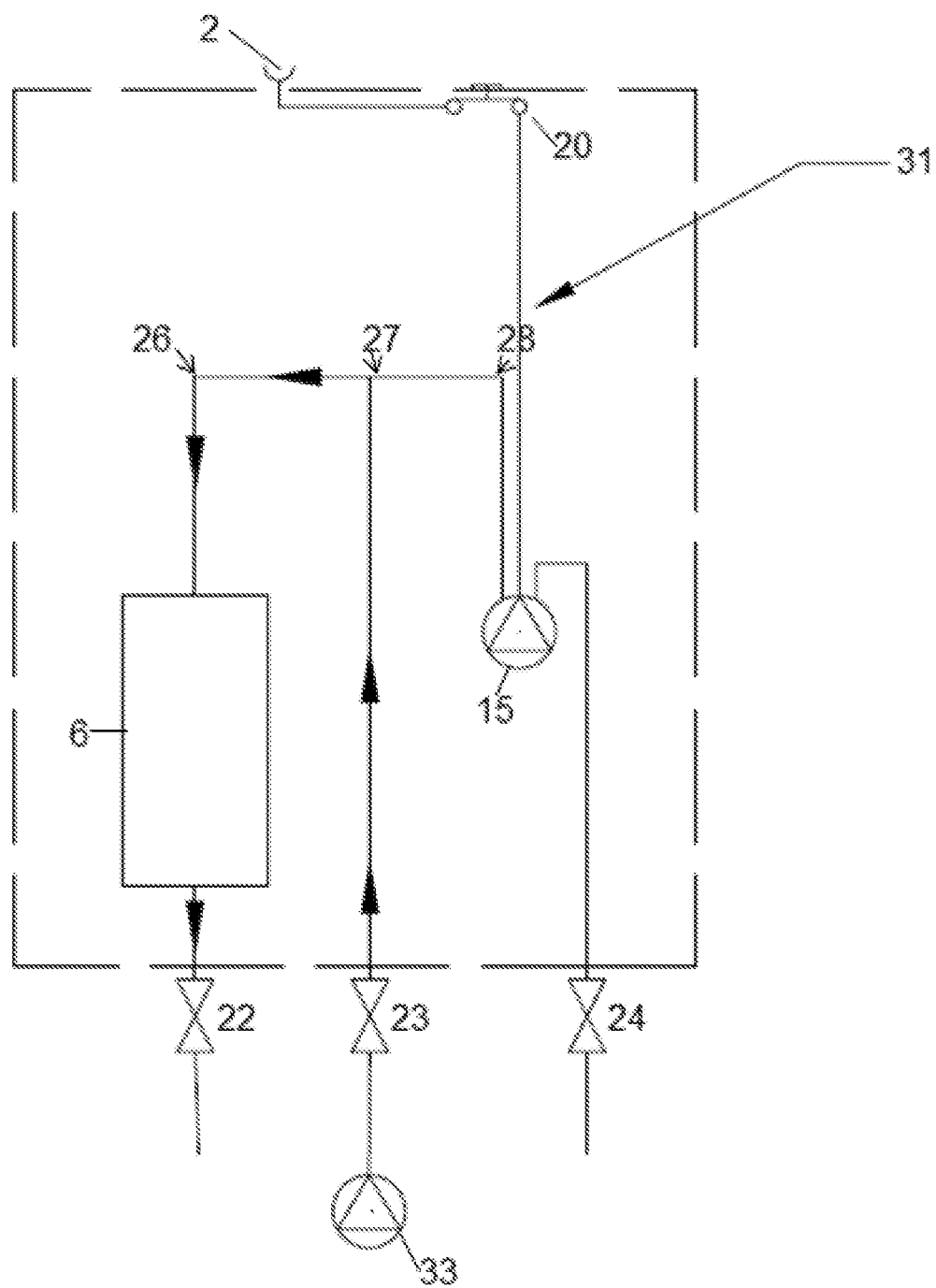

Now, with reference to FIGS. 3 and 4, these figures show another embodiment of the device 100 for water disinfection by ultrafiltration. In this case, unlike the embodiment of FIGS. 1 and 2, the pump 15, for example, a diaphragm or piston pump, is included in the casing 10 of the device and configured for operating by suction.

FIG. 3 depicts a submersible mesh filter 21, valves 22, 23, 24, the ultrafiltration membrane 6, the pump 15, the electric cable 31 for connecting the pump 15 to a push button 20, the connectors between the pump 15 and the ultrafiltration membrane 6, particularly bends 26, 28, and a T-shaped connector 27, and the electric supply connection 2 which is connected by means of the mentioned cable 9 (in this case not illustrated in the drawings) to the USB or micro USB port 11 of the portable communication device 4.

In one embodiment, depending on the pump 15, valve 22 is open allowing the flow of the water to be filtered to pass therethrough. In this case, the ultrafiltration membrane 6 receives the mentioned flow by pressure. Valve 23 is closed and valve 24 is open, with the pump 15 operating by suction.

FIG. 4 illustrates the operating diagram when cleaning the ultrafiltration membrane 6. In this case, a drive pump 33 drives a clean water flow through valve 23 with the valve being in an open position. In this case, valve 24 is closed. The pump 15 suctions the mentioned flow to the ultrafiltration membrane 6, with dirty water flow leaving through valve 22.

Likewise, the casing 10 of FIGS. 3 and 4 may further include one or more nanofiltration membranes (not illustrated for the sake of simplicity of the drawings) for eliminating salts and/or heavy metals. The mentioned nanofiltration membrane/membranes is/are located in the casing in a position in which it receives/they receive the water flow leaving the pump 15.

In any of the described embodiments, the pump 5, 15 of the device 100 can operate in the range of 3 to 24 V with suitable electronics.

Likewise, in any of the described embodiments, there is furthermore arranged in the casing 10 of the filtering assembly an ultraviolet light illumination unit 14 for eliminating bacteria, viruses, fungi, and spores that may be present in the filtered water flow which has passed through the ultrafiltration membranes 6. To that end, ultraviolet light illumination unit 14 is arranged facing the part of the outlet conduits 13 which is located inside the casing 10.

The ultraviolet light illumination unit 14 receives electrical energy from the power supply provided by the battery included in the portable communication device 4. The electrical consumption of the device including the pump 5, 15 and the ultraviolet light illumination unit 14 is, in a non-limiting manner, less than or equal to 30 W.

Similarly, the casing 10 of the filtering assembly may further include one or more sensors 1 configured for measuring properties of the water in the filtered water flow and for emitting data representative of such properties. The properties measured by the sensors 1 may include one or more of the following: conductivity, pH, nitrate content, colorimetry, and turbidity of the filtered water flow.

The sensors 1 are operatively connected with the portable communication device 4 through wireless technology, including Bluetooth, for example, and the portable communication device 4 is suitable for performing computer processing on the data provided by the sensors 1 and for adapting the operation of the pump 5 or stopping it depending on a result obtained from the processing.

It should be noted that the sensors 1 and the ultraviolet light illumination unit 14 were not illustrated in FIGS. 3 and 4 for the sake of simplicity of the drawings.

As is common in smartphones, the portable communication device 4 includes a user interface which is used for displaying at least part of the data provided by the sensors and/or the result of the computer processing thereof. The user interface includes a screen and a keypad of the smartphone, where the screen can be a touch screen and the keypad a virtual keypad.

The scope of the present invention is defined by the attached claims.

The invention claimed is:

1. A device for water disinfection by ultrafiltration, comprises:
    a filtering assembly with at least one ultrafiltration membrane (6) inside a casing (10);
    a pump (5, 15), powered with electrical energy, configured for driving a water flow to be filtered to said at least one ultrafiltration membrane (6); and
    an electric supply connection (2) for powering said pump (5) from a power supply, wherein:
    said at least one ultrafiltration membrane (6) is located in said casing (10) in a position in which the ultrafiltration membrane (6) receives the water flow to be filtered by gravity or pressure;
    the power supply is provided by a battery included in a portable communication device (4); and
    a current consumed by the pump (5) is below 1.2 A, with a supply voltage of between 3 and 24 V.

2. The device according to claim 1, wherein said casing (10) of the filtering assembly further houses an ultraviolet light illumination unit (14) for eliminating bacteria, viruses, fungi, and spores that may be present in the water flow which has passed through said at least one ultrafiltration membrane (6), with said ultraviolet light illumination unit (14) being powered from said power supply.

3. The device according to claim 2, wherein a power consumption of the device including the pump (5, 15) and the ultraviolet light illumination unit (14) is less than or equal to 30 W.

4. The device according to claim 1, wherein the pump (5) is a submersible pump.

5. The device according to claim 4, comprising two ultrafiltration membranes (6), and wherein a water supply to said membranes comprises a feed tube (12) from the submersible pump (5) which is subdivided by a fork (7) into two branches (8), one for each of the ultrafiltration membranes (6) from which respective outflows are fed through respective outlet conduits (13), with a pressure of the water flow entering the ultrafiltration membranes (6) being kept the same as or greater than atmospheric pressure.

6. The device according to claim 1, wherein the pump (15) is included in said casing (10) and configured for operating by suction.

7. The device according to claim 6, wherein the pump (15) comprises a diaphragm or piston pump.

8. The device according to claim 6, further comprising at least one nanofiltration membrane for eliminating salts and/or heavy metals, wherein the at least one nanofiltration membrane is located in said casing (10) in a position in which the at least one nanofiltration membrane receives the water flow leaving the pump (15).

9. The device according to claim 1, wherein said casing (10) of the filtering assembly further includes one or more sensors (1) configured for measuring properties of the water flow and for emitting data representative of said properties, said one or more sensors (1) being operatively connected with said portable communication device (4), which is configured for performing computer processing on the mentioned data, and depending on a result of said processing, for adapting the operation of the pump (5, 15) or stopping it.

10. The device according to claim 9, wherein the one or more sensors (1) are configured for measuring one or more of the following properties: conductivity, pH, nitrate content, colorimetry, and turbidity.

11. The device according to claim 9, wherein the portable communication device (4) includes a user interface configured for displaying at least part of said data and/or the result of the computer processing thereof.

12. The device according to claim 9, wherein said one or more sensors (1) are connected with said portable communication device (4) through wireless technology.

13. The device according to claim 12, wherein said wireless technology includes Bluetooth.

14. The device according to claim 1, wherein said electric supply connection (2) for powering the pump (5, 15) is connected by means of a cable (9) to a USB or micro USB port (11) of the portable communication device (4).

* * * * *